United States Patent [19]

Konigsberg

[11] 4,095,990

[45] Jun. 20, 1978

[54] DRY FLEXIBLE GLUE COMPOSITIONS AND METHOD OF MAKING SAME

[75] Inventor: Moses Konigsberg, Tenafly, N.J.

[73] Assignee: Hudson Industries Corporation, West Orange, N.J.

[21] Appl. No.: 708,486

[22] Filed: Jul. 26, 1976

[51] Int. Cl.$^2$ .......................................... C09H 11/00
[52] U.S. Cl. .................................. 106/136; 106/137; 106/148; 106/308 Q
[58] Field of Search ............... 106/148, 137, 136, 147, 106/308 Q; 252/28, 449, 144

[56] References Cited

U.S. PATENT DOCUMENTS

| | | | |
|---|---|---|---|
| 1,300,097 | 4/1919 | Alexander | 106/136 |
| 2,316,146 | 4/1943 | Adams | 106/147 |
| 2,322,736 | 6/1943 | Pike et al. | 106/136 |
| 2,387,643 | 10/1945 | Champun | 106/14.5 |
| 2,413,007 | 12/1946 | Srere | 106/148 |
| 2,692,869 | 10/1977 | Pechukas | 106/308 Q |
| 2,796,356 | 6/1957 | Di Vincenzo | 106/287 S |

FOREIGN PATENT DOCUMENTS 1,007,465 10/1965 United Kingdom.

*Primary Examiner*—Theodore Morris
*Attorney, Agent, or Firm*—Albert F. Kronman

[57] ABSTRACT

Disclosed are flexible glue compositions in dry form wherein the liquid plasticizers are incorporated and absorbed in a siliceous material and then mixed with conventional animal glue components. To use, the resulting mixture is heated with water. These glue compositions produce glue films of greater strength which have faster drying rates and better non-blocking properties than prior art compositions of this type.

The compositions contain from 10 to 90 parts by weight of animal glue components, the balance a siliceous compound of an alkaline earth metal containing from 100 to 500 percent by weight thereof of a plasticizer.

9 Claims, No Drawings

DRY FLEXIBLE GLUE COMPOSITIONS AND METHOD OF MAKING SAME

BACKGROUND OF THE INVENTION

This invention relates generally to dry flexible glue compositions and to a method for preparing the same. In particular, the invention relates to flexible glue compositions containing synthetic hydrous alkaline earth metal silicates or synthetic silicates.

The adhesive industry defines a flexible glue as one whose film remains flexible for long periods of time under conditions of average use. Animal glue, which is the protein polymer derived from animal hides and bones is made flexible by the addition of a plasticizer.

Over the past decades, glycerine has proven to be the best plasticizer for animal glue and is the standard when comparing film flexibility and retention of flexibility over extended periods of time. Depending upon the degree of flexibility desired the amount of glycerine may vary from 30 to 125% of the glue.

For economic or performance reasons, other liquid plasticizers may be employed or partially substituted for glycerine. These materials are various polyols, such as glycols, dextrose, corn syrup, sorbitol and the like. Flexible glue formulae may also contain inorganic salts, clays, pigments, solvents, surfactants, odorants, defoamers, etc. depending upon the end use or economic requirements.

Flexible glue is generally prepared by dispersing the dry animal glue in cold water, allowing the granules to swell raising the temperature to 130°-160° F., dissolving the glue and then adding the plasticizer and other ingredients. After adjusting to the proper specifications, the flexible glue is drawn off in suitable containers, and shipped after gelling, in the form of flexible cakes.

Some years ago the adhesive industry introduced so-called dehydrated flexible glue compositions. These are dry blends of ground animal glue; solid plasticizers such as sugar, dextrose, corn syrup solids, etc; inorganic salts, such as magnesium sulfate, sodium chloride, etc; fillers; and small additions of defoamer and odorants. The primary advantages of such products are in lower freight costs, longer shelf life of the product and flexibility in controlling solids on application. The great disadvantage is the inability to attain flexibility of the glue film equivalent to that obtained with glycerine and, therefore, these dehydrated flexible glues have limited application.

STATEMENT OF THE PRIOR ART

In addition to the technology above discussed, the art to which this invention relates also is aware, inter alia, of the following U.S. Pat. Nos. 1,217,331; 1,479,472; 3,436,300; 3,095,313; and 3,028,340. While certain of these patents disclose glue compositions containing various silicates, their use thereof is for purposes different from that set forth herein and in different amounts.

SUMMARY OF THE INVENTION

I have now found a method of incorporating liquid plasticizers into dry animal glue which allows the production of a true dehydrated flexible glue. This method also allows one to incorporate any liquid modifier needed for specific purposes, such as solvents, surfactants defoamers, odorants, oils, resins, colorants, preservatives, and other flexible glue components conventionally employed.

The compositions of this invention comprises from 10 to 90 parts by weight of animal glue combined with finely divided absorbent siliceous compounds of an alkaline earth metal having absorbed therein liquid constituents of a flexible glue.

The method utilizes the absorptive properties of synthetic alkaline earth metal silicates such as hydrous calcium silicates produced by Johns-Manville under the name of "Micro-cel" and other specially prepared synthetic silicas. Such silicas may include "Cab-O-Sil", manufactured by Cabot Corporation; "Syloid", manufactured by W. R. Grace Co.; "Hi Sil", manufactured by Pittsburg Plate Glass Company; "Sipernat", manufactured by Degussa (Germany). These materials can absorb from 100 to 500 times their weight of liquid and remain in free flowing powder form.

Unpredictably and unexpectedly, in addition to allowing the introduction of liquids into dry formulations, it has also been found that the siliceous material, due to their large surface area, enhance the adhesion characteristics and strength of the animal glue film in many cases. Moreover, they increase the rate of drying and impart improved non-blocking properties to the film.

The synthetic silicate materials such as "Micro-cels" can absorb from 100 to 500% of their weight of glycerine and mixtures of glycerine with other liquids. Their available surface area ranges from 95 to 175 square meters per gram and their particle size is such as will pass through a 325 mesh screen.

DISCLOSURE

In the practice of the present invention, the silicate and the liquids to be absorbed are blended together and then mixed with the dry glue components. A preferred way of operating is to place the silicate in a suitable blender, such as ribbon blender, Patterson-Kelly blender, or the like and add the liquid to be absorbed by a spray nozzle or other suitable method. The resulting "dry" liquid may then be blended with the desired grade of animal glue and any other dry material deemed necessary to attain a specific result. The product then is mixed with a desired weight of water and heated to around 140° to 160° F. to form the ready to use glue.

As can readily be seen, this process offers great latitude to adhesive formulators for producing a host of products heretofore unobtainable.

EXAMPLES

The invention is further illustrated in a non-limiting way by the following examples:

EXAMPLE #1

A mixture was blended from:

| | |
|---|---|
| Micro-cel A | 100 parts |
| 99¼% Glycerine | 175 parts |

The resulting product is dry and free flowing.

EXAMPLE #2

A mixture was blended from:

| | | |
|---|---|---|
| Micro-cel A | 100 parts | |
| 99¼% Glycerine | 158 parts | |
| Defoamer | 10 parts | pre-mixed |
| Surfactant | 6 parts | |

| | -continued | |
|---|---|---|
| Odorant | 1 part | |

The resulting products is dry and free flowing.

EXAMPLE #3

A mixture was blended from the following:

| | | |
|---|---|---|
| Micro-cel E | 100 parts | |
| 99½% Glycerine | 120 parts | |
| Propylene Glycol | 120 parts | Pre-mixed |
| Defoamer | 10 parts | |
| Cellosolve Acetate | 20 parts | |
| Surfactant | 2 parts | Pre-mixed |
| Odorant | 1 part | |
| Dye | 2 parts | |

The "Micro-cel" particles are of a size such that less than 1% will be retained on a 325 mesh screen.

The resulting product is dry, free flowing and colored.

EXAMPLE #4

125 parts of Micro-cel A was placed in a laboratory Patterson-Kelly blender and 275 parts of 99½ glycerine was introduced over a ten minute period. After mixing for five minutes, the product was a free flowing powder. There was then added 510 parts of 250 gram hide glue which was blended for ten minutes. The resulting product, when cooked with an equal part of water at 140°–160° F gave a glue dispersion that was useful as a nonwarp laminant for gluing paper to paper board. The dried glue film was very tough and flexible.

EXAMPLE #5

The same procedure as in Example #4 is repeated using 125 parts of "Syloid" 244, 240 parts of 99½% glycerine, and 560 parts of 250 gram hide glue.

EXAMPLE #6

The same procedure as in Example #4 is repeated using 100 parts of "Cab-O-Sil" M-5, 375 parts of 99½% glycerine, and 875 parts of 250 gram hide glue.

EXAMPLE #7

The procedure is the same as in Example #4. To 100 parts of Micro-cel E, was added a liquid mixture of the following: 99½% glycerine 120 parts, Propylene glycol 110 parts, butyl carbitol acetate 30 parts, defoamer 10 parts (Nopco JMU) nonionic surfactant 2.5 parts (Triton X-100), colorant 1 part (caramel), odorant 1.5 parts (methyl salicylate).

To 220 parts of this free flowing blend was added 400 parts of 315 gram hide glue, 195 parts of sucrose, 180 parts of magnesium sulfate, and five parts of zinc sulfate. This mixture was blended for 10 - 15 minutes. This product when cooked at 65% solids at 140°–160° F performed well as a lining-up glue in the production of books.

These examples illustrate the use of a fumed silica, a precipitated silica and a synthetic hydrous calcium silicate in the practice of this invention.

In all cases, the effect of adding glycerine was clearly demonstrated by the increased flexibility of the glue film and the increased retention of flexibility over an extended period of time.

It is intended to cover by the following claims all changes, modifications and variations of the invention disclosed herein that would be self-evident to a man of ordinary skill in the flexible glue art.

What is claimed is:

1. A dry flexible glue composition dispersible in water to form a ready-to-use glue comprising from 10 to 90 parts by weight of an animal glue; the balance being a finely divided, highly absorbent, siliceous compound of an alkaline earth metal or a synthetic silica, containing from 100 to 500 percent by weight thereof of a liquid glue plasticizer absorbed therein.

2. The composition of claim 1, wherein said plasticizer is glycerine.

3. The composition of claim 1, wherein said siliceous compound is a synthetic hydrous calcium silicate having a particle size such as will pass through a 325 mesh screen.

4. A process for making a flexible glue composition in dry form comprising mixing a liquid plasticizer with a finely divided, highly absorbent, siliceous compound of an alkaline earth metal or a synthetic silica and then blending the resulting mixture with a dry animal glue to give the desired dry flexible glue composition containing said plasticizer absorbed in said siliceous compound or silica.

5. The process of claim 4, wherein said dry flexible glue composition is dispersed in water by heating to form the ready to use glue.

6. The composition of claim 1 comprising: 125 parts of hydrous calcium silicate, 275 parts of glycerine and 510 parts of hide glue.

7. The composition of claim 1 comprising: 125 parts of synthetic silica, 240 parts of glycerine, and 560 parts of hide glue.

8. The composition of claim 1 comprising: 100 parts of synthetic silica, 375 parts of glycerine and 875 parts of hide glue.

9. The composition of claim 1 comprising: 220 parts of a free flowing blend including 100 parts of hydrous calcium silicate, 120 parts of glycerine, 110 parts of propylene glycol, 30 parts of butyl carbitol acetate, 10 parts of a defoamer, mixed with 400 parts of animal glue, 195 parts of sucrose, 180 parts of magnesium sulfate and five parts of zinc sulfate.

* * * * *